Feb. 25, 1930.  C. H. RANKIN  1,748,462
FEEDING MECHANISM
Original Filed Sept. 12, 1919  5 Sheets-Sheet 1

Inventor
Carl H. Rankin
By Geo. E. Tew
Attorney

Feb. 25, 1930.                    C. H. RANKIN                    1,748,462
                              FEEDING MECHANISM.
                  Original Filed Sept. 12, 1919    5 Sheets-Sheet 2

Feb. 25, 1930.　　　　C. H. RANKIN　　　　1,748,462
FEEDING MECHANISM
Original Filed Sept. 12, 1919　　5 Sheets-Sheet 3

Feb. 25, 1930.   C. H. RANKIN   1,748,462
FEEDING MECHANISM
Original Filed Sept. 12, 1919   5 Sheets-Sheet 4
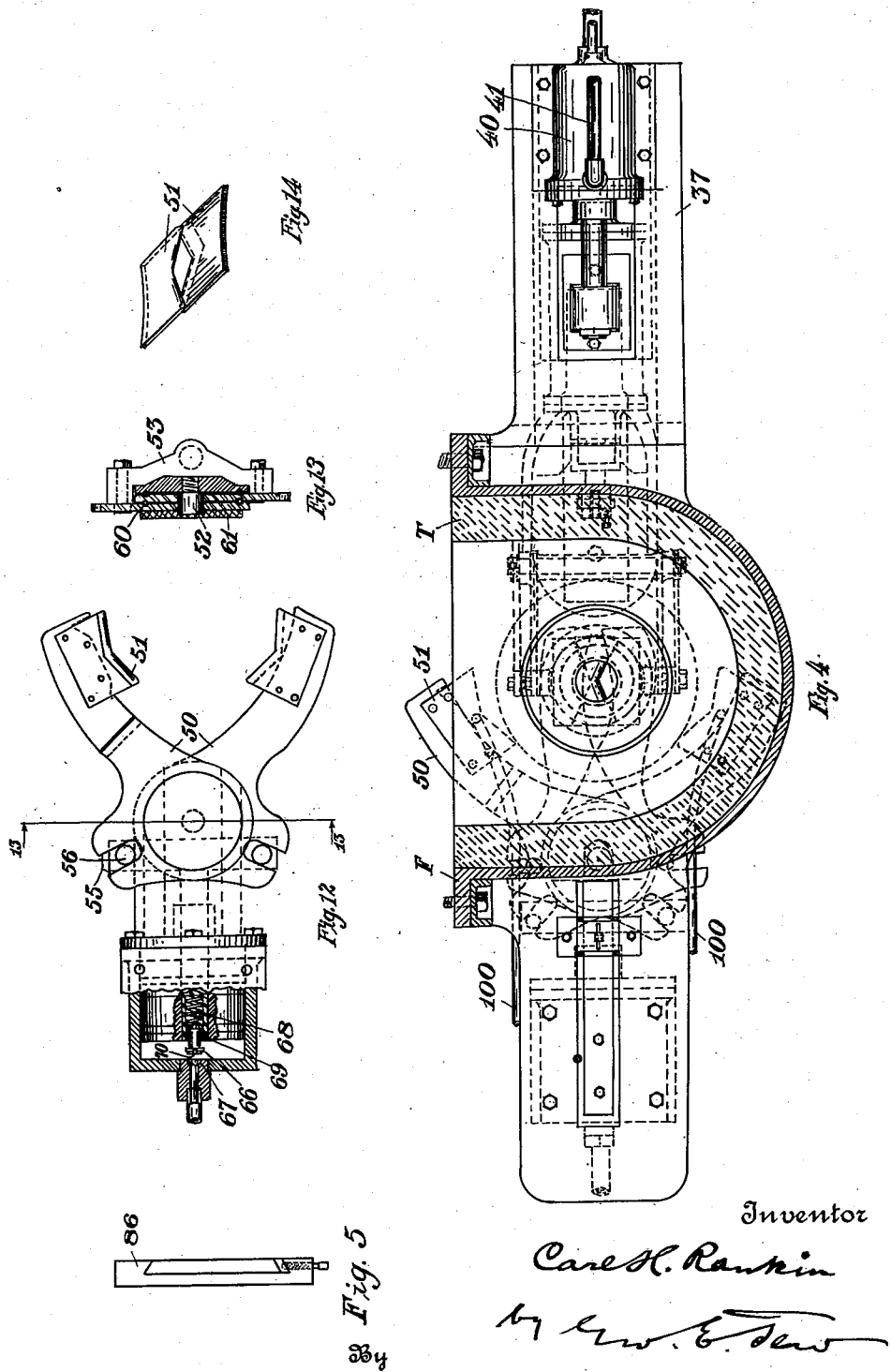
Inventor
Carl H. Rankin
By
Attorney Feb. 25, 1930.   C. H. RANKIN   1,748,462
FEEDING MECHANISM
Original Filed Sept. 12, 1919   5 Sheets-Sheet 5
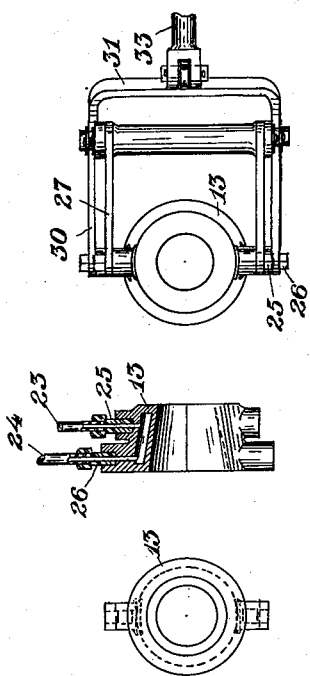

Patented Feb. 25, 1930

1,748,462

UNITED STATES PATENT OFFICE

CARL HENRY RANKIN, OF WELLSBURG, WEST VIRGINIA, ASSIGNOR, BY MESNE ASSIGNMENTS, TO HARTFORD-EMPIRE COMPANY, OF HARTFORD, CONNECTICUT, A CORPORATION OF DELAWARE

FEEDING MECHANISM

Application filed September 12, 1919, Serial No. 547,907. Renewed March 29, 1922.

The feeding or delivery of glass by means of machines from a tank to molds for example is attended with certain practical difficulties arising from the nature of molten glass. These difficulties are well understood in the art, and are often due to the contact of the masses or lumps of glass being fed with surfaces of different temperatures, which results in a chilling or surface imperfection resulting in striations or what are called "waves" in the finished article, which is particularly objectional in illuminating or ornamental ware.

Machines have been proposed for feeding glass in predetermined quantities from a tank or other container to a mold, usually involving or including cut-off devices for separating the stream of glass into individual pieces or lumps and depositing the same in molds placed to receive them, preliminary to pressing and blowing. The interruption of flow which occurs after each piece is cut off has also resulted in the imperfections referred to, because of the cooling action of the shears on the successive charges.

The object of the present invention is to provide a machine by means of which the flowing glass will to as large an extent as possible be kept out of contact with metal parts, and which will deliver the glass from the tank without depositing the same in any intermediate carrier or cut-off device, the passage from the neck of the tank being continuous for each charge, and each lump or charge instead of being delivered in the "stalactite" form which molten glass usually assumes when flowing through a hole, will be delivered in the form of a lump closely analogous to the "gather" of a hand operated tool, and this lump when cut off will drop directly from the tank neck into a mold placed to receive it.

The present machine is characterized by numerous mechanical advantages which will be more fully apparent from the following description.

Figure 1:
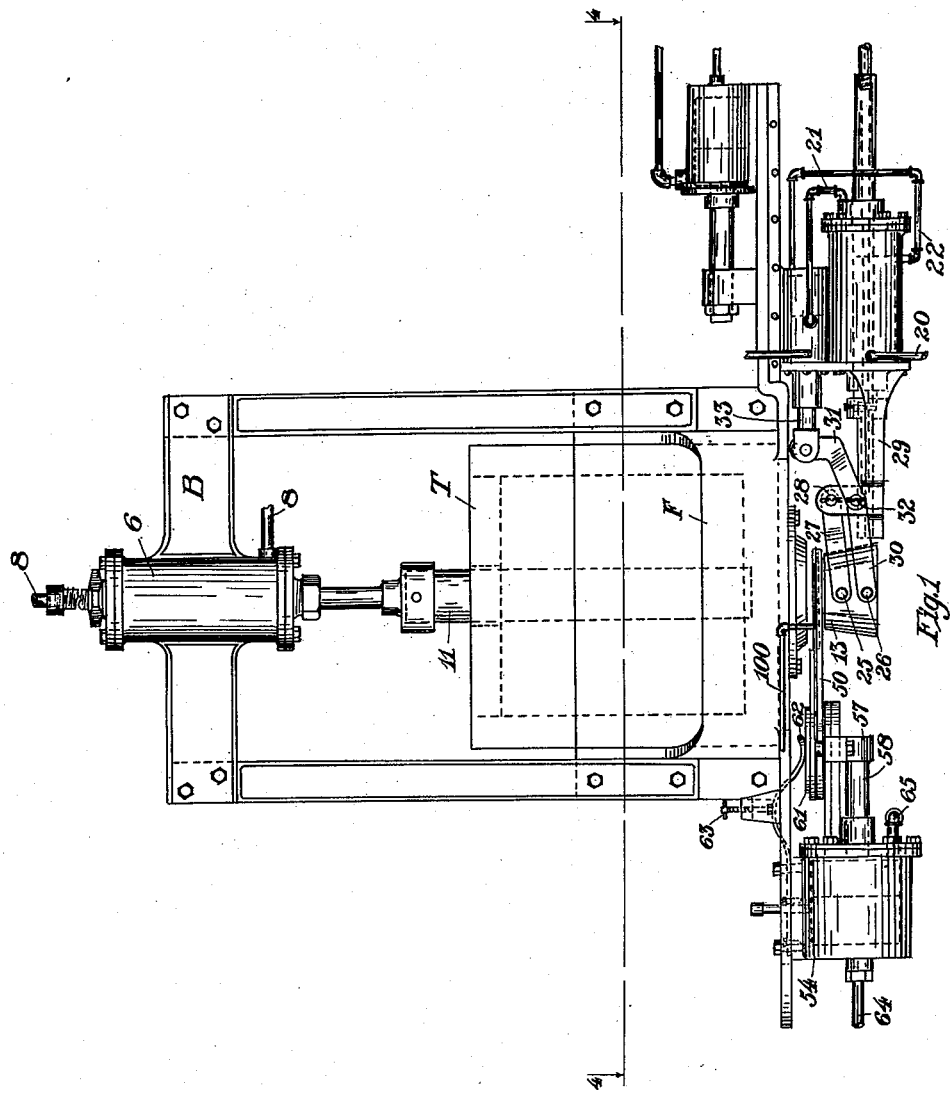
Figure 2:
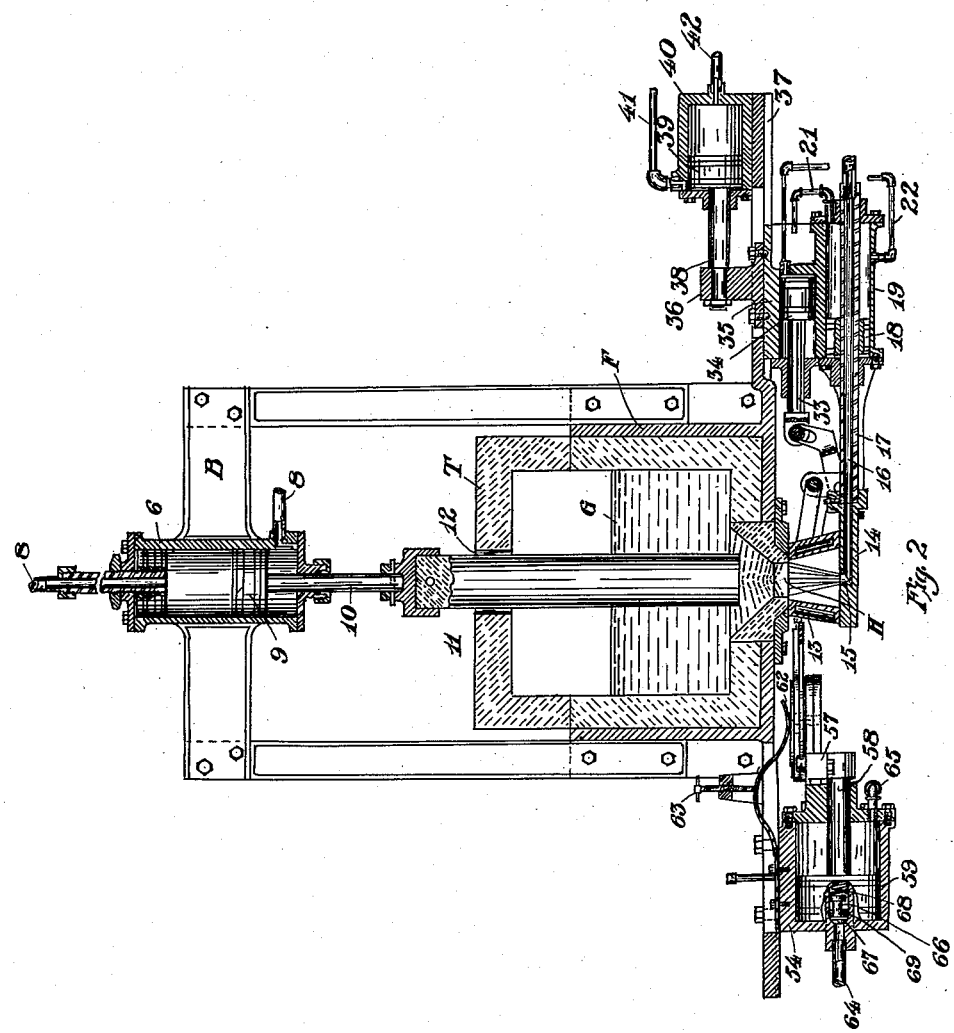
Figure 3:
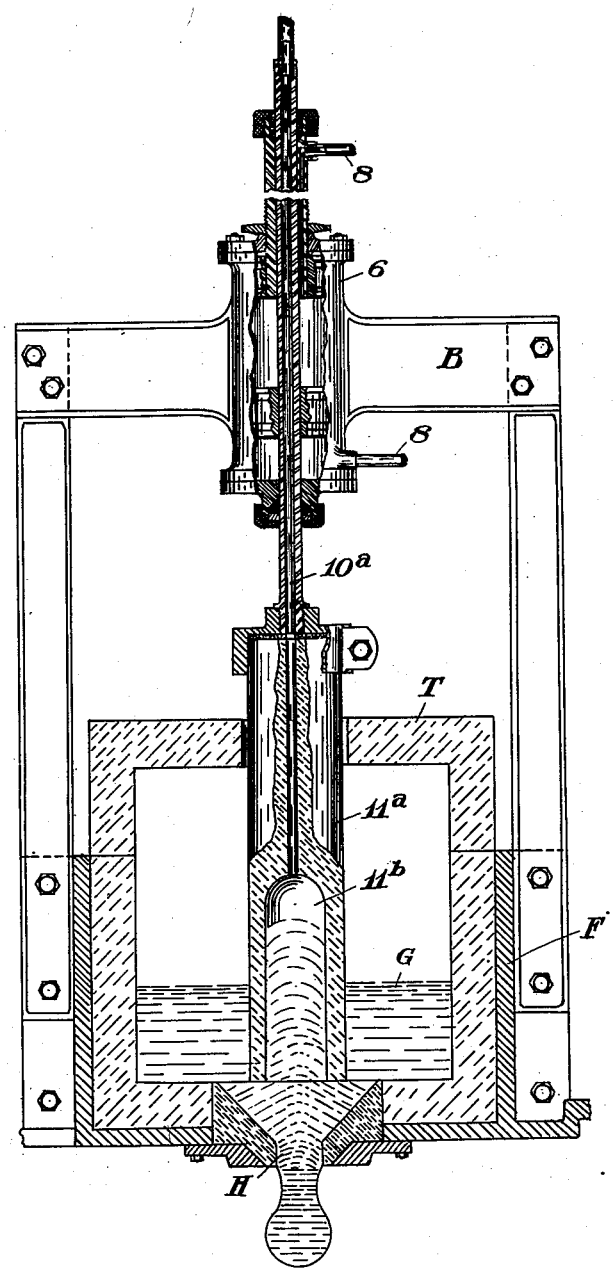

In the accompanying drawings Fig. 1 is a front elevation of the feeding machine. Fig. 2 is a vertical section. Fig. 3 is a similar section of a modification. Fig. 4 is a horizontal section on the line 4—4 of Fig. 1. Fig. 5 is an end view of a slide. Fig. 6 is a top view of what I will term a heating box, and part of its operating mechanism. Fig. 7 is a section of the box. Fig. 8 is a bottom view thereof. Fig. 9 is a top plan view of a blast member working under the bottom of the box. Fig. 10 is a bottom view of a modified form of box. Fig. 11 is a section of Fig. 10 with the blast member in position thereunder. Fig. 12 is a detail in plan of the cut-off shears and their operating devices. Fig. 13 is a section on the line 13—13 of Fig. 12. Fig. 14 is a perspective of the shear blades.

In the drawings T indicates the delivery neck which projects from the side of a glass tank, not shown, in a manner not substantially different from that well known in this art, the molten glass being indicated at G, and adapted to be delivered from the neck through a hole H at the bottom of a funnel shaped throat on the under side of the neck. Associated with and partly surrounding this neck is a casing or frame F which includes two standards S with a cross bar B at the top supporting a vertical cylinder 6 adapted to alternately receive and exhaust air or other fluid pressure through pipes 8 respectively communicating with the top and bottom thereof. Within the cylinder is a piston 9 connected by a rod 10 to a plunger 11 which is preferably made of fire clay or other refractory material and which works through a hole 12 in the top of the neck and depends through the same into position with its lower end directly above and in line with the discharge mouth H in the funnel shaped member referred to, which is also preferably clay or other refractory substance.

Located directly below the discharge opening is a cylindrical protecting or heating box 13, which is preferably frustro conical in shape, having its opening in line with the discharge opening from the tank. Below this heating box, in turn is a combined bottom plate and nozzle indicated at 14, having a discharge opening 15 directed upwardly and concentric with the axis of the heating box and the hole H. A combustible mixture of air and gas will at times, by means to be hereinafter described, be supplied under pressure through a tubular passage 16 which extends through the member 14 and also through the hollow rod 17 to which it is connected. Fixed to this rod is a piston 18 which operates in a cylinder 19 which is provided with pipe connections 20 and 21 at opposite ends, and an intermediate connection 22 which latter is adapted to be uncovered by the reciprocation of the piston on its successive strokes.

The heating box or member 13 has hollow walls so that it may be water cooled through pipe connections 23 and 24 (Fig. 7) leading to any suitable source of water supply.

This heating box 13 is provided with upper and lower sets of trunnions at opposite sides, as indicated at 25 and 26, and the upper set are connected by links 27 to studs 28 projecting upwardly from a bracket 29 extending from the head of the cylinder 19. The lower trunnions 26 are connected to the arms of a yoke lever 31 which is fulcrumed at 32 on the bracket 29 referred to and which is cranked at its rear end and connected to a rod 33 carried by a piston 34 which works in a cylinder 35 located directly above the cylinder 19, and all supported by being bolted to a slide 36 which works in a dove-tail groove 37 in the bed of the frame F. The slide 36 is connected to the rod 38 of a piston 39 which operates in a cylinder 40 adapted to receive air pressure at either end through pipes 41 and 42. The mechanical construction and arrangement of these parts may be varied in any suitable manner according to the desires of the builder.

Air pressure is supplied to the cylinder 35 from either of pipes 43 or pipe 22 heretofore referred to, and the pipe 21, heretofore referred to, taps the cylinder 35 in such position as to be uncovered by the piston 34.

At this point it may be explained that the pistons 18 and 34 operate in opposite directions respectively, resulting from the pipe connections referred to. For example, assuming that air pressure is supplied through the inlet 43, the piston 34 is forced to the right, and when it uncovers the pipe 21 the pressure flows through that pipe to the opposite end of the cylinder 19, forcing the piston 18 to the left. Meanwhile the air in the right hand end of the piston 34 exhausts through the pipe 22 into the cylinder 19 and then out through the pipe 20. And on the reverse stroke, air admitted through pipe 20 forces the piston 18 to the right, and when it uncovers the pipe 22 the pressure forces the piston 34 to the left, the trapped air in the right hand end of the cylinder 19 escaping through the pipe 21 to the cylinder 35 and thence out through the pipe 43. The details of these operations, on the action of the machine will be described hereinafter.

The shears are shown particularly in Figs. 1, 2 and 12 and comprise a pair of arms 50 to which the shear blades 51 are attached. These blades work on an arc intersecting the axis of the discharge opening H and are positioned to close directly below the same. Each arm 50 turns on a pivot 52 supported by a bracket 53 projecting from the head of a cylinder 54. The rear ends of the arms have cam slots 55 receiving studs 56 projecting from a cross head 57 on a rod 58 connected to the piston 59 which works in the cylinder 54. The shear arms preferably turn on ball bearings 60 contained in ring grooves concentric with the pivot 52, shown in Fig. 13, and are held together by a tension cap 61 resting on the upper arm. This cap 61 is pressed by a flat spring 62 fastened to the cylinder 54 and adjusted by a screw 63.

The cylinder 54 has pipe connections 64 and 65 at opposite ends, through which air pressure may be supplied to reciprocate the piston. To avoid pounding of the piston on the back stroke I have provided a cushioning valve shown especially in Figs. 2 and 12. This valve 66 is set in a bore in the rear end of the piston rod and seats against a seat 67 in a fitting connecting pipe 64, with a spring 68 behind the valve. The outward movement of the valve is limited by a bushing 69 screwed in the bore. As the piston moves to the left in Fig. 2, before reaching the end of its stroke the valve closes against the seat 67 and thereby forms a cushion for the further movement of the piston 59, gradual escape of the trapped air being permitted through a bleeder port 70 in the head of the valve. This is a minor feature of the apparatus, but is of some importance in practice as it cushions the opening movement of the shears and prevents slamming. On the closing movement of the shears there is no cushion as the glass provides suitable resistance.

The particular structure of the shear blades 51 is of some importance. The cutting edge of each shear blade forms a V so that the edges of the respective blades cross each other at an angle, and the shear is therefore completed at the apex of each V. Also each blade is slightly convex in cross section, with their convex sides presented toward each other so that their edges are always in contact at the point of intersection and they have a self-sharpening effect on each other as they open and close, as well as a double shearing action with the cut advancing toward the axis at each side until the apexes of the edges cross each other. This structure is shown somewhat exaggerated in Fig. 14, as only a very slight convexity is necessary. In this connection it may be said that the tension spring holds the blades with the edges in close contact at all times. The V shaped cutting edges are also of peculiar advantage in the severing of a stream of glass, since the cross section of the stream is reduced making a very short "shear mark" in comparison to shears having a straight edge which tends to elongate the cross section and produce objectionable results on the finished article. The cylinder 54 is conveniently bolted to the under side of the frame F opposite to the parts heretofore described in connection with the cylinders 19 and 35.

As will be gathered from the above description the movement of the various parts are affected by fluid pressure, and these movements will be timed according to the desired operation of the machine by the operation of suitable controlling valves, forming a timing mechanism. These valves will be found fully disclosed in my pending application No. 323,946 filed September 15, 1919, and an illustration is considered unnecessary in this application, since the same results could be accomplished by different forms of controlling valves. However it may be stated that, as disclosed in said application, the valves will comprise three-way valves which operate to admit air alternately, in proper time, to opposite ends of the cylinders, and to simultaneously exhaust the same from the opposite sides of the pistons.

Assuming therefore that the valves are properly operated the operation of the present mechanism is as follows. In the position shown in Fig. 2 the piston 34 has been moved to the right. This lifts the heating box 13 to contact with the under side of the neck, the links 27 and 30 producing a parallel motion which insures close contact of the top of the box to the bottom of the neck. At the same time, the piston 18 will have been advanced and the member 14 moved to a position directly under the bottom of the box 13 and in close contact therewith. This forms a closed chamber which protects the lump of glass to be delivered, from the outside air. When the parts are in this closed position a blast of combustible air and gas mixture is introduced through the passage 16 and port 15 and is projected upwardly against the glass at the outlet opening H, by which it is immediately ignited. This pressure prevents any outward or downward flow of the body of glass, supporting the same in nonflowing position and the combustion supplies the necessary heat to prevent any tendency of the glass to cool at the outlet. The next movement is produced by the reversal of the air supply in the cylinder 19, which moves the piston 18 to the left and retracts the member 14 from its position under the heating box, and directly after it clears the box the piston 34 is moved to the left (in consequence of by-pass of pressure through the pipe 22), and the box 13 is dropped to the position shown in Fig. 1, say about an inch or so below the mouth H. Immediately afterwards air is admitted to the top of the cylinder 6 and the plunger 11 is forced down with a rather rapid stroke and forcibly ejects a mass or lump of glass through the mouth H. Because of this plunger or forcing action the lump of glass, instead of assuming a tapered form, has the form of a bulb or lump as indicated in Fig. 3, closely analogous, as said before, to the gather of a hand operated tool; and as the plunger approaches the orifice the flow is more or less restricted, forming a contracted neck at the top of the lump, as outlined in Fig. 3. This is a most desirable shape for the delivery of the lump to the mold, which, it will be understood, is placed below in position to receive the same. Also, on the up stroke of the plunger it has a tendency to retract the flow or mass of glass so that the stopping or dwelling action of the gas blast below, as shown in Fig. 2, is assisted. The action takes place so quickly that before the mass of glass, in consequence of the action of gravity, has time to resume its flow, the box 13 and the blast nozzle will have moved to position below the mouth and in effect seal the same, as indicated in Fig. 2.

The lump having been forced out of the mouth as above described, and the nozzle retracted and the box dropped, the next action is to shear the lump at its neck. At this time air is admitted behind the piston 59, driving the same forward or to the right in Fig. 2, and the shears close. The lump thus severed then drops freely through the box 13 into the mold below. In this connection it may be said that the opposite movement of the shear blades, and the relatively small cross section of the neck of glass prevents any tendency to throw the lump sidewise, as would occur with a single shear and a stream of large cross section, and accordingly the lump drops in the direct axis of the mouth and into the center of the mold. The lump having been severed air is admitted to the opposite end of the cylinder 54 and the shears are quickly retracted and opened for the next operation. And immediately the operation of the pistons 18 and 34 is reversed, the box lifts to contact with the neck of the tank, and the nozzle member 14 advances to closed position under the bottom of the box, and the blast is then admitted to support the glass until the next operation of the plunger as above described.

As above explained the cylinders 35 and 19 and the parts carried thereby are mounted on a slide 36. The purpose of this is to throw all of the parts out of action if and when desired. This is done by admitting air pressure from any suitable valve or source through the pipe 41 forcing the piston 39 to the right which carries with it the slide 36 and the parts secured thereto. These parts may be again put in operative position by admitting pressure through the pipe 42. As stated above the system of valves employed for automatically producing the described operation will be found disclosed in my accompanying application, but it may be noted that the pipe connections between the cylinders 19 and 35 are such that the drop of the box 13 immediately follows the retraction of the member 14, and the advance of the member 14 immediately follows the lift of the box 13. Various systems of valves may be employed for effecting the described operation, and so for as this case is concerned no limitation is implied to the particular valve mechanism utilized.

In Fig. 1 I have shown pipes 100 which deliver a spray of oil and air onto the respective shears at the time they are about to close. This assists the shearing action and tends to cool the shears as will be understood by anyone familiar with the operation of shearing blades on molten glass. The combustible mixture supplied to the chamber 13 is preferably such that the temperature of that chamber and the adjacent parts will be as great as, or a little greater than, the temperature of the molten glass, so that the injurious results of cooling the stream of glass, which results when a stream is exposed to the air, are avoided, and this temperature practically persists or continues in consequence of the quickness of the action, until the lump is severed and falls into the mold.

The conical shape of the chamber 13 is advantageous, as it avoids contact of the lump of glass with the sides thereof, and it will be seen that from the time the glass leaves the tank, until it drops into the mold, it is not exposed to contact with any metal parts, except during the brief instant it is being severed by the shears, which is too short to produce any injurious results.

Variations in the amount of glass discharged at each stroke of the plunger may be accomplished by variations of the size of the mouth H and the stroke of the plunger 11, the latter being subject to control by suitable valve mechanism.

It will be noted that the flow of glass through the orifice is arrested without the use of any mechanical closure for the opening H, but solely by the action of the combined body of combustible gas which not only arrests the flow but also assists in maintaining the desired temperature. Also the flow of glass is not dependent upon the action of gravity, which is uncertain because of the tendency of molten glass to cling to the surfaces of the outlet, but is accomplished by a positive action of the discharge plunger.

In the modified form shown in Fig. 3, instead of a solid plunger 11 co-operating in its action with gaseous pressure from below, I may employ the modification shown in Fig. 3, utilizing suction in the plunger itself instead of the blast from below. This plunger 11ª has an axial cavity 11ᵇ in its lower end communicating with a pipe 10ª which may lead to any suitable source of vacuum control, so timed that when the plunger is in raised position a vacuum will be drawn in the cavity 11ᵇ thereby arresting the flow by lifting the glass therein; and when the plunger descends the vacuum is broken and light air pressure is admitted to dislodge the glass from the cavity of the plunger and assist the expelling action of the plunger in discharging the requisite quantity of glass through the mouth H. I have found that a relatively light pressure is advantageous in this connection to avoid any excessive blowing action through the outlet.

It is my experience that feeding machines which depend on gravity flow are impractical and it will be noted that in the present machine for gravity there is substituted a positive expulsion of a charge which may be varied and which will deliver a predetermined quantity of glass much quicker than when gravity is relied upon to produce the same. The operation of the various parts has been illustrated and described in connection with pneumatic or other pressure operated means. It is obvious that mechanical or other means may be substituted to produce similar operations of the moving parts, but because of their positive action and ease of control the air cylinders referred to will be found very convenient and practical.

This machine has been described and illustrated in relation to feeding glass, but it is not limited to this use, since I apprehend that it may be advantageously employed for feeding molten metal to a casting or other apparatus, and hence no limitation with respect to the use of the machine is implied.

I claim:

1. The combination with a tank for molten material, having a discharge outlet, of a tubular gas confining member movable to and from said outlet, and a gas feeding member movable into and out of line with said outlet and tubular member and adapted to discharge a stream of gas through said tubular member and against the material in said outlet, to arrest the flow thereof.

2. The combination with a tank for molten material, having a discharge outlet, of a tubular gas confining member movable to and from said outlet, and a gas feeding member movable into and out of line with said outlet and tubular member and adapted to discharge a stream of gas through said tubular member and against the material in said outlet, to arrest the flow thereof and a cutting member movable across said outlet, when the confining member is moved therefrom, to sever the material flowing from said outlet.

3. The combination with a tank for molten material, having a discharge outlet, of a tubular gas confining member movable to and from said outlet, and a gas feeding member movable into and out of line with said outlet and tubular member and adapted to discharge a stream of gas through said tubular member and against the material in said outlet, to arrest the flow thereof, said tubular member being tapered, with its smaller end toward the said outlet.

4. The combination with a molten glass feeding neck having an outlet in its under side, of a tubular gas-confining box movable up and down to and from said outlet, and a bottom-closure member for said box, having a gas supply passage opening upwardly into the box, said member being movable laterally into and out of position under said box.

5. The combination with a molten glass feeding neck having an outlet in its under side, of a tubular gas-confining box movable up and down to and from said outlet, and a bottom-closure member for said box, having a gas supply passage opening upwardly into the box, said member being movable laterally into and out of position under said box, and a shearing member movable laterally across the axis of the outlet, between the outlet and the box when the latter is lowered.

6. The combination with a container for molten material, having an outlet in its under side, of a tubular gas-confining box movable up and down below said outlet and adapted to confine gas pressure thereto, a gas-supply and bottom closure member under said box and movable into and out of line therewith, a shear member movable across under the outlet when the box is lowered, means to move the box up and down, means to move the said closure member under the bottom of the box when the latter is raised and to withdraw the same therefrom before the box is lowered, and means to move the shear member across under the outlet when the box is lowered and withdraw the same before the box is raised.

7. The combination with a tank for molten material having a discharge outlet, of a nozzle member, mechanism to move the same into and out of line with said outlet, and adapted to direct a stream of gas into said outlet, a box between the nozzle and outlet, adapted to confine the gas to the latter, mechanism to move the box to and from the outlet, and a support for said member, mechanism and box, movable to shift the same into and out of operative position with respect to the outlet.

8. The combination with a tank for molten material, having a discharge outlet, of a tubular gas confining member movable to and from said outlet, and a gas feeding member movable into and out of line with said outlet and tubular member and adapted to discharge a stream of gas through said tubular member and against the material in said outlet.

In testimony whereof, I affix my signature.

CARL HENRY RANKIN.